(12) United States Patent
Betin et al.

(10) Patent No.: US 7,133,427 B2
(45) Date of Patent: Nov. 7, 2006

(54) PHASE CONJUGATE LASER AND METHOD WITH IMPROVED FIDELITY

(75) Inventors: Alexander A. Betin, Manhattan Beach, CA (US); Robin A. Reeder, El Segundo, CA (US); Robert W. Byren, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 319 days.

(21) Appl. No.: 10/666,176

(22) Filed: Sep. 19, 2003

(65) Prior Publication Data

US 2005/0063446 A1    Mar. 24, 2005

(51) Int. Cl.
*H01S 3/10* (2006.01)
*H01S 3/098* (2006.01)
*H01S 3/08* (2006.01)
*G06K 9/08* (2006.01)

(52) U.S. Cl. .............................. 372/19; 372/9; 372/98; 372/103; 359/738

(58) Field of Classification Search ................. 372/9, 372/19, 98–108; 359/738
See application file for complete search history.

(56) References Cited

U.S. PATENT DOCUMENTS

| | | | |
|---|---|---|---|
| 4,275,454 A * | 6/1981 | Klooster, Jr. ................ 708/821 |
| 4,493,085 A | 1/1985 | Valley et al. |
| 4,498,184 A * | 2/1985 | O'Meara ..................... 372/92 |
| 4,549,144 A * | 10/1985 | Summers .................... 359/346 |
| 4,573,157 A * | 2/1986 | O'Meara ..................... 372/19 |
| 4,734,911 A | 3/1988 | Bruesselbach |
| 4,757,268 A * | 7/1988 | Abrams et al. .............. 330/4.3 |
| 4,802,175 A * | 1/1989 | Suzuki .......................... 372/8 |
| 4,802,176 A * | 1/1989 | O'Meara ..................... 372/19 |
| 4,944,591 A | 7/1990 | McMichael et al. |
| 5,120,128 A * | 6/1992 | Ulich et al. ................. 356/121 |
| 5,148,323 A * | 9/1992 | Campbell et al. ........... 359/738 |

(Continued)

OTHER PUBLICATIONS

D. M. Pepper, "Nonlinear Optical Phase Conjugation", Optical Engineering, vol. 21, No. 2, p. 156,1982.

(Continued)

*Primary Examiner*—James Menefee
*Assistant Examiner*—Phillip Nguyen
(74) *Attorney, Agent, or Firm*—John E. Gunther; Leonard A. Alkov; Karl A. Vick (57) ABSTRACT

A spatial filter adapted to increase the angular spread of non-conjugated energy in a beam and suppress this energy to improve the efficiency of a phase conjugate system. In the illustrative embodiment, the filter includes first and second lenses and an aberrator to increase the angular spread. In the specific embodiment, an opaque plate, with a pinhole aperture therethrough, is sandwiched between the lenses to suppress the non-conjugated energy. The aberrator may be implemented with an amplifier or other suitable mechanism. Likewise, the aperture may be replaced with a highly angle-selective thick Bragg grating or other suitable arrangement. A phase conjugate master oscillator/power amplifier laser architecture is also disclosed. In an illustrative embodiment, the novel architecture includes a master oscillator adapted to output a laser beam; a power amplifier beam line in optical alignment with the beam; a mechanism for creating a beam having phase conjugate energy and non-conjugated energy; and at least one inventive spatial filter in alignment with the amplifier. The inventive filter is adapted to increase the angular spread of non-conjugated energy in a beam and suppress this energy to improve the efficiency of the system. In a specific implementation, the beamline includes plural amplifiers, each with one of the novel spatial filters disposed therebetween.

15 Claims, 5 Drawing Sheets

U.S. PATENT DOCUMENTS

| | | | |
|---|---|---|---|
| 5,228,051 | A | 7/1993 | Matthews |
| 5,430,748 | A * | 7/1995 | MacCormack et al. 372/29.016 |
| 5,504,763 | A * | 4/1996 | Bischel et al. ............... 372/33 |
| 5,729,380 | A | 3/1998 | Betin et al. |
| 5,760,388 | A * | 6/1998 | Swandic .................... 250/221 |
| 6,700,698 | B1 | 3/2004 | Scott |

OTHER PUBLICATIONS

R. A. Fisher (ed.), "Optical Phase Conjugation", Academic Press, New York, 1983.

V. Wang and C. R. Giuliano, "Correction of Phase Aberrations via Stimulated Brillouin Scattering", Optics Letters 2, p. 4 (1978).

D. A. Rockwell and D. S. Sumida, "Phase Conjugation, Beam Combining and Diagnostics", SPIE vol. 739 pp. 2-6, 1987.

A. Betin, "Phase Conjugation Based on Thermal Nonlinearity", NThB1 at Nonlinear Optics: Materials, Fundamentals, and Applications Conference, Maui, Hawaii, Jul. 1996, Techn. Digest, v. 11, p. 336-339.

A. Betin, Energy Characteristics of a Loop Laser with a Thermal Holographic Mirror Using Millisecond Pulses at 1.06 um Nonlinear Optics: Materials, Fundamentals, and Applications Conf., Maui, HI Jul. 1996, Techn. Digest v.11, p. 92-93.

A. Betin et al., "Q-switched Nd:YAG Loop Laser with a Thermal Holographic Mirror", CThN4, CLEO'96 Anaheim, Jun. 1996, Proc. p. 448.

S. C. Matthews et al., Aberration Correction of ms Pulses at 1.06 um Using a Loop Conjugator with Thermal Gratings CFF8, CLEO'96, Anaheim, Jun. 1996, Proc. p. 510.

A. Betin et al., "1 ms Long Pulse Nd:YAG Laser with Loop PCM", CLEO'97, Baltimore, May 1997, Proc. p. 283.

A. Betin et al., "Vector Phase Conjugation with Loop Laser Geometry", Proceedings for CLEO'97, Paper CtuL4, pp. 202-203, May 1997.

A. Betin et al., "Phase Conjugation of Depolarized Light with a Loop PCM", Nonlinear Optics: Materials, Fundamentals and Applications Conference, Kauai, Hawaii, Aug. 1998, Techn. Digest, p. 288-290.

* cited by examiner

PHASE CONJUGATE LASER AND METHOD WITH IMPROVED FIDELITY

BACKGROUND OF THE INVENTION

1. Field of the Invention

The present invention relates to lasers. More specifically, the present invention relates to systems and methods for improving the performance of high power lasers.

2. Description of the Related Art

Spatial filtering has been used in low-power systems to improve the beam quality of a laser beam. This approach simply discards the portion of the beam that lies outside the desired far field central lobe, thereby reducing the efficiency of the laser. Unfortunately, this approach is impractical for high power lasers due to the excess power required and heating of the blocking aperture.

Other approaches have involved an adjustment of various design parameters to improve fidelity. The design parameters for phase conjugate lasers have included a number of incoming beam parameters such as beam divergence, beam diameter, polarization state, pulse shape and format, wavelength, aberration shape or order, coherence and so on. Other design parameters that might be adjusted include parameters of the conjugator such as the length of the nonlinear medium; geometries of the beam interactions inside the nonlinear medium such as focus, beam intersection, length of the beam overlap region, angle between beams, choice of nonlinear medium and etc.

Unfortunately, this approach forces undesirable compromises in design. Further, this approach has been heretofore unsuccessful in the attainment of the fidelity required for current and future applications.

Hence, there is a need in the art for a system or method for improving phase conjugation fidelity in high power phase conjugate lasers and other electro-magnetic systems.

SUMMARY OF THE INVENTION

The need in the art is addressed by the teachings of the present invention. In accordance with the invention, a novel spatial filter is taught. The inventive filter is adapted to increase the angular spread of non-conjugated energy in a beam and suppress this energy to improve the efficiency of the system.

In the illustrative embodiment, the filter includes first and second lenses, a spatially-dependent beam clipper disposed in the focal region between the lenses to suppress the non-conjugated energy, and an aberrator to increase the angular spread of the beam. In the specific embodiment, the spatially dependent beam clipper comprises an opaque plate, with a pinhole aperture therethrough. The aberrator may be implemented with a distorting optic, laser amplifier or other suitable mechanism. Likewise, the lenses and spatially-dependent beam clipper may be replaced with a highly angularly selective thick Bragg grating or other suitable arrangement. A phase conjugate master oscillator/power amplifier laser architecture is also disclosed. In an illustrative embodiment, the novel architecture includes a master oscillator adapted to output a laser beam; a power amplifier beamline in optical alignment with the beam; a mechanism for creating a beam having phase conjugate energy and non-conjugate energy; and at least one inventive spatial filter in alignment with the amplifier. The inventive filter is adapted to increase the angular spread of non-conjugated energy in a beam and suppress this energy to improve the efficiency of the system. In a specific implementation, the beamline includes plural amplifiers each with one of the novel spatial filters disposed therebetween.

A novel loop phase conjugate resonator is also taught. In the illustrative embodiment, the inventive resonator includes a mechanism for providing an interference pattern; an amplifier in alignment with the mechanism for providing an interference pattern; and a spatial filter in alignment with the amplifier and adapted to increase the angular spread of non-conjugate energy in a beam amplified thereby and suppress the spread non-conjugate energy in the beam.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Nonlinear optical phase conjugation is a real-time process which creates a conjugate optical beam (other names used are "time reversed" and "wavefront or phase reversed" replica beam) that has a reversed wavefront (phase) and propagates backward relative to the incident optical beam. The process of nonlinear optical phase conjugation is known in the art and described in multiple references, including for example: "Nonlinear Optical Phase Conjugation" published by D. M. Pepper in Optical Engineering, Vol. 21, No. 2, p. 156, 1982 and Optical Phase Conjugation published by R. A. Fisher (ed.), in Academic Press, New York, 1983.

Nonlinear optical methods, mainly nonlinear dynamic holography and stimulated scattering methods, are typically used for nonlinear optical phase conjugation. In mathematical terms an ideal phase conjugation process is described as:

$$E_{IN} = E(r)e^{i(\omega t - kz)} + \text{complex conjugate} \quad [1]$$

$$E_C = E^*(r)e^{i(\omega t + kz)} + \text{colplex conjugate} \quad [2]$$

$$E(r) = A(r)e^{i\phi(r)} \quad [3]$$

$$E^*(r) = A(r)e^{-i\phi(r)} \quad [4]$$

where: $E_{IN}$ and $E_C$ are the vector electromagnetic fields of the incident and conjugate beams, respectively;

$E(r)$ is the vector complex amplitude;

$A(r)$ is the vector amplitude;

$\phi(r)$ is the phase; and $\omega$ and k are the angular frequency and wave propagation number, respectively.

The phase conjugation process plays an important role in laser physics and optics. A device that realizes the phase conjugation effect is called a phase conjugate mirror (PCM), meaning that it acts like a mirror providing a "reflection" of an incident beam but with the phase conjugation features described above.

Any real phase conjugation process is not ideal and the reflected beam ($E_{OUT}$) coming from a phase conjugate mirror (backward to the incident beam, $E_{IN}$) carries the conjugate beam spatially mixed with non-conjugate components, simultaneously. Phase conjugation fidelity is a quantitative parameter that characterizes the ability of a PCM to return a beam with a phase front that is an exact conjugate of the input beam. A rigorous definition of phase conjugation fidelity ($\chi$) is given by the following:

$$\chi = \frac{\left| \int E_{OUT} \cdot E_{IN} dx dy \right|^2}{P_{OUT} \cdot P_{IN}} \quad [5]$$

where: $E_{IN}$ and $E_{OUT}$ are the vector complex amplitude profiles of the electric fields of the incident and reflected beams and $P_{IN}$ and $P_{OUT}$ are the incident and reflected powers.

The phase conjugation fidelity is the fraction of the power contained in a reflected beam that is conjugate to the incident beam. Obviously, the maximum achievable value of phase conjugation fidelity is 100%.

Phase Conjugate MOPA Architecture

Figure 1:
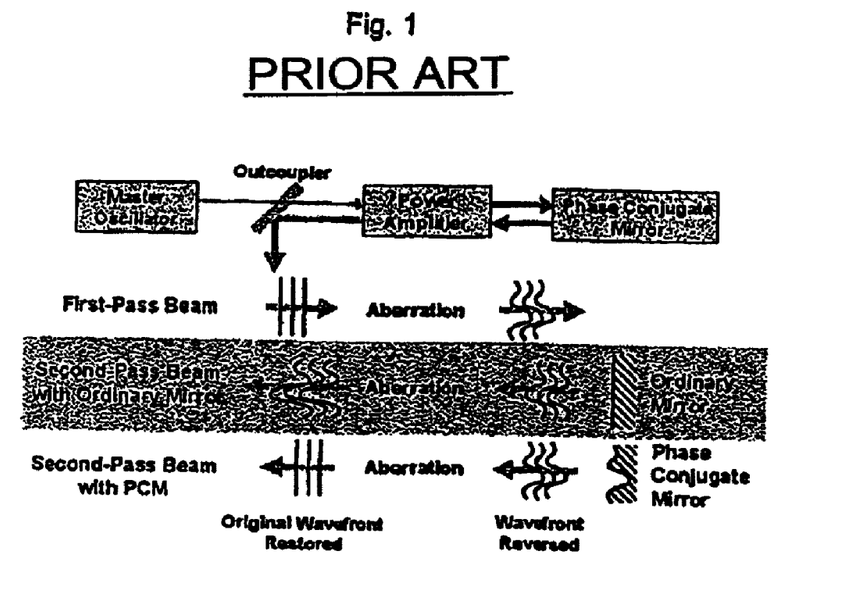
FIG. 1 shows a 2-pass phase conjugate master oscillator/power amplifier (PC MOPA) implemented in accordance with conventional teachings.

Nonlinear optical phase conjugation is traditionally used to correct the optical aberrations in a distorting medium such as a highly pumped solid-state amplifier or chain of amplifier elements, also known as an amplifier "beamline." One laser architecture that employs a phase conjugate mirror in this application is depicted in FIG. 1.

FIG. 1 shows a 2-pass phase conjugate master oscillator/power amplifier (PC MOPA) implemented in accordance with conventional teachings. The essential features and theory of operation of the PC MOPA architecture are described in "Correction of Phase Aberrations via Stimulated Brillouin Scattering" published by V. Wang and C. R. Guiliano in *Optics Letters* 2, p. 4 (1978); "Solid-State Laser Power Scaling Using Phase Conjugation" published by D. A. Rockwell and D. S. Sumida in SPIE Vol. 739, Phase Conjugation, Beam Combining and Diagnostics, pp. 2–6, 1987; and U.S. Pat. No. 4,734,911 entitled EFFICIENT PHASE CONJUGATE LASER, issued Mar. 29, 1988 to H. W. Bruesselbach, the teachings of which are incorporated by reference herein.

In the PC MOPA architecture, a laser master oscillator delivers a diffraction-limited reference beam to the output end of a power amplifier through an output coupler element (outcoupler) that may be a standard beamsplitter, a combination of polarizer and polarization rotator, a combination of interferometer and wavelength shifter, or other means known in the art. This reference beam is then amplified in two passes through the amplifier beamline, extracting a significant portion of the optical power stored in the amplifier media (population inversion). Phase distortions caused by thermal lensing and beam wander caused by thermal/structural compliance in the optical bench, optical elements and mounts, and amplifier pumpheads within the amplifier beamline are phase reversed (conjugated) by the PCM. The original diffraction-limited phase front is restored as it passes back through the amplifier chain. By design, the beam intensities within the amplifier beamline are well below the threshold for nonlinear processes (SBS, SRS, nonlinear index), minimizing power and phase information loss. Relay imaging is typically used to minimize the loss of phase information through diffraction and clipping at the amplifier apertures, ensuring that the phase information needed for proper correction is not lost. The relay imaging lenses may be tilted slightly to reduce the intensity at the focal regions, preventing air breakdown while self-correcting the induced astigmatism, as taught by Matthews in U.S. Pat. No. 5,228,051 issued Jul. 13, 1993, the teachings of which are incorporated herein by reference. Cooled straylight baffles and beam dumps may also be used to control the unabsorbed pumplight and broad-angle fluorescence.

Figure 2:
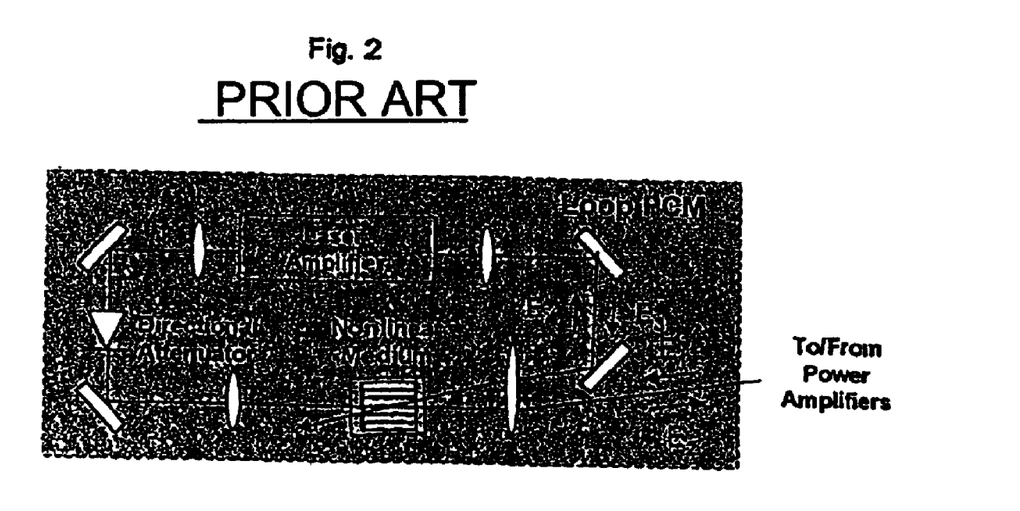
FIG. 2 shows an optical schematic of the loop phase conjugate mirror scheme based on thermal nonlinearity in liquids.

FIG. 2 shows an optical schematic of the loop phase conjugate mirror scheme based on thermal nonlinearity in liquids. This scheme is described by Betin, et al in: 1) "Phase Conjugation Based On Thermal Nonlinearity," published by A. A. Betin in paper NThB1 at *Nonlinear Optics: Materials, Fundamentals, and Applications Conference*, Maui, Hawaii, July 1996, Techn. Digest, v. 11, p. 336–339; 2) "Energy Characteristics of a Loop Laser with a Thermal Holographic Mirror Using Millisecond Pulses at 1.06 µm" published by A. A. Betin, S. C. Matthews, and M. S. Mangir in *Nonlinear Optics: Materials, Fundamentals, and Applications Conference*, Maui, Hawaii, July 1996, Techn. Digest, v. 11, p. 92–93; 3) "Q-switched Nd:YAG Loop Laser with a Thermal Holographic Mirror" published by A. A. Betin and M.S. Mangir in paper CThN4, CLEO'96, Anaheim, June 1996, Proc. p. 448; 4). "Aberration Correction of ms Pulses at 1.06 µm Using a Loop Conjugator with Thermal Gratings" published by S. C. Matthews, A. A. Betin, and M.S. Mangir in paper CFF8, CLEO'96, Anaheim, June 1996, Proc. p. 510; and 5) "1 ms Long Pulse Nd:YAG Laser with Loop PCM," published by A. A. Betin, R. Forber, S. C. Matthews, and M. S. Mangir in CLEO'97, Baltimore, May 1997, Proc. p. 283.

The loop PCM is configured as a unidirectional loop resonator with a high-gain laser amplifier. The aberrated input beam from the amplifier beamline, denoted in FIG. 2 as E1, enters the nonlinear medium from the right and traverses the loop in a clockwise direction. A directional attenuator comprising a Faraday rotator and two polarizer elements is used to prevent saturation of the gain medium (amplifier) in this direction. The clockwise beam is directed into the nonlinear medium where its interference with the input beam writes an optical grating in the nonlinear medium.

In a specific embodiment, the nonlinear medium is an absorbing liquid medium and the interference fringes create regions of high and low temperature (T) which produce corresponding regions of low and high index of refraction (n) through the coupling parameter, dn/dT, which is a characteristic of the medium. This process is known in the art as "thermal nonlinearity" or "thermal scattering." This grating is a real-time holographic mirror, which, in conjunction with the fixed mirrors in the loop, provides sufficient optical feedback for a resonant laser mode to build from noise in the counterclockwise direction around the loop. The Faraday rotator is set up to have a high transmission in this direction.

A portion of this beam is outcoupled via the grating in the nonlinear medium and exits to the right, opposite the input beam direction. The lowest order mode of this resonator is the phase conjugate mode; and, with proper mode discrimination, the output beam is the phase conjugate replica of the input beam.

Depolarization, caused for example by thermally induced stress birefringence within the amplifier beamline, can also be compensated by using a "vector" loop PCM architecture. This approach is described by Betin, et al. in "Vector Phase Conjugation with Loop Laser Geometry," published in *Proceedings for CLEO '97*, Paper CtuL4, pp. 202–203, May 1997 by A. A. Betin, S. C. Matthews, and M. S. Mangir; "Phase Conjugation of Depolarized Light with a Loop PCM" published in *Nonlinear Optics: Materials, Fundamentals, and Applications Conference*, Kauai, Hawaii, August 1998, Techn. Digest, p. 288–290 by A. A. Betin, S. C. Matthews, and M. S. Mangir; and U.S. Pat. No. 5,729,380 entitled LOOP PHASE-CONJUGATE MIRROR FOR DEPOLARIZED BEAMS issued Mar. 17, 1998 to A. A. Betin and M. S. Mangir, the teachings of which are incorporated herein by reference. This approach uses a polarization splitter outside the loop and polarizing elements inside the loop to create two distinct holographic gratings within the nonlinear medium, one for each polarization eigenstate. A polarization mixer is also used inside the loop to provide a prescribed amount of crosstalk between the two polarization paths, which causes them to phase lock. When the two orthogonally-polarized, phase conjugated beams recombine at the external polarization splitter, the relative phase is the same as the input beam before splitting. This ensures that the original polarization of the master oscillator beam is restored after the phase-conjugated beam retraces its path through the depolarizing elements.

The unique features of the thermal nonlinearity loop PCM include: very high power scalability; high étendue loop resonator (typically ~100×DL correction); high reflectivity (typically >100%); broad wavelength band (visible through long wave IR); rapid response to wavefront changes (typically <0.1 ms); and waveform flexibility from Q-switched through true CW.

The present invention addresses the general problem of achieving high beam quality in a 2-pass phase conjugate master oscillator/power amplifier (PC MOPA) laser architecture. Self-pumped phase conjugate mirrors useful in high power laser applications are based on nonlinear optical phenomena that start from random optical noise. Under the right conditions of gain and mode selection, the phase conjugate mode dominates the reflected beam, however there is nonetheless generally some component of noise or a higher order mode that reduces the fidelity of the phase conjugation process. The non-conjugate portion, while amplified in the power amplifier beamline, does not correct the aberrations in the amplification process and reduces the beam quality of the amplified laser beam. Specifically, this invention reduces the portion of the output power corresponding to the non-conjugate modes without significantly reducing the overall efficiency of the power amplifier.

One element of this invention uses an aberrator and spatial filter combination within a loop phase conjugate mirror to suppress the non-conjugate, highly divergent spatial components of the generated laser beam within the loop resonator, thereby increasing the value of the phase conjugation fidelity. Another element of this invention uses large-étendue spatial filters in conjunction with the relay imaging optics disposed between the plural power amplifier stages of the amplifier beamline within a phase conjugate master oscillator/power amplifier laser system to clip a significant fraction of the power of the non-conjugate component of the laser beam before appreciable amplification, thereby improving the output beam quality without significantly reducing the overall efficiency of the laser.

In the illustrative implementation set forth below, an improved system and method of phase conjugation fidelity is taught in a 2-pass phase conjugate master oscillator/power amplifier laser system through the use of spatial filtering and optical aberration: (1) in association with relay imaging optics disposed between successive laser amplifier stages of the power amplifier beamline and/or between the power amplifier beamline and the PCM, (2) within the laser resonator portion of a loop phase conjugate mirror, or (3) a combination of the above. These general embodiments are described individually below.

1. Spatial Filtering within Relay Imaging Optics of Amplifier Beam line

Figure 3:
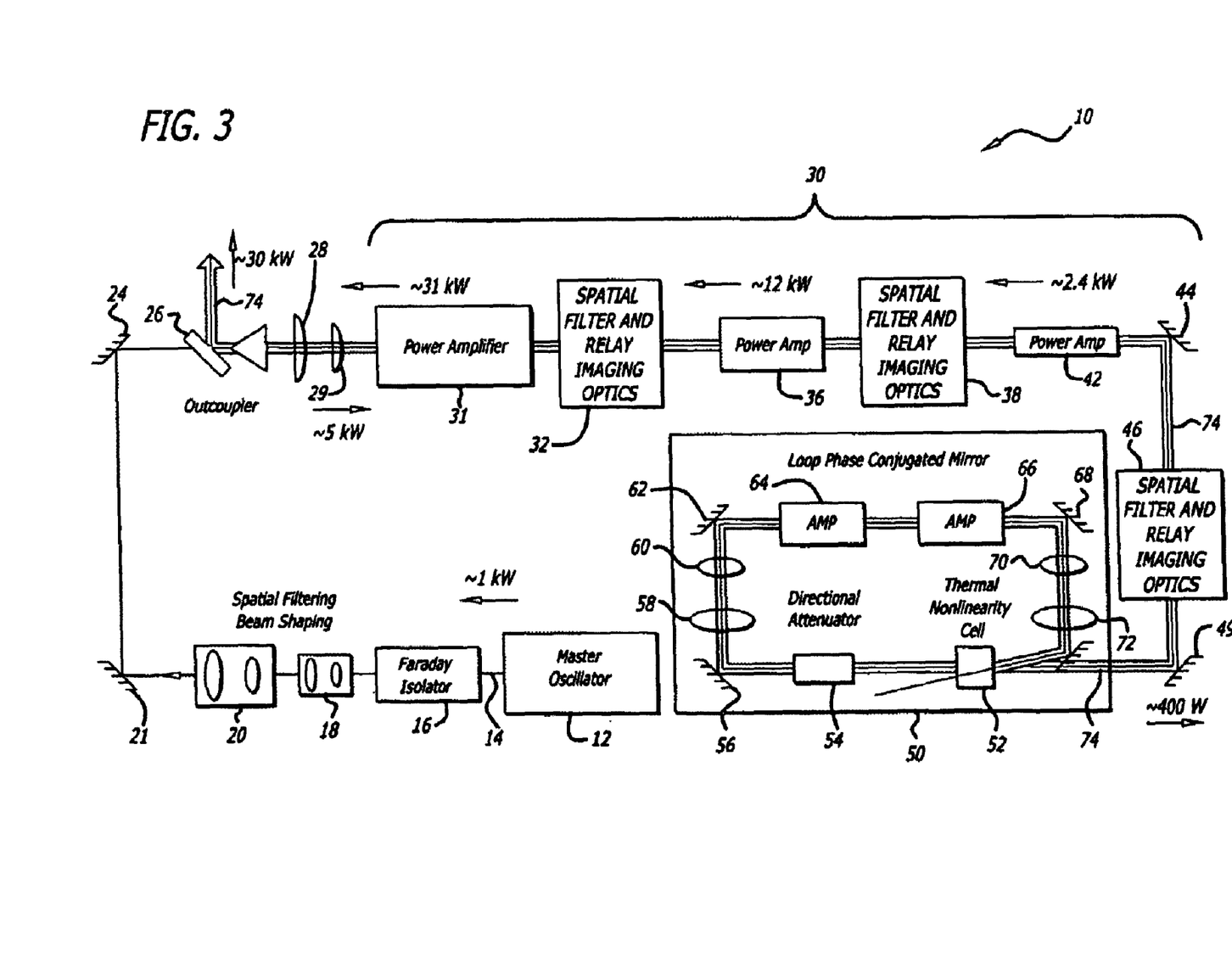
FIG. 3 is an optical schematic of a first embodiment of an exemplary PC MOPA design in accordance with an illustrative embodiment of the teachings of the present invention.

FIG. 3 is an optical schematic of a first embodiment of an exemplary PC MOPA design in accordance with an illustrative embodiment of the teachings of the present invention. The embodiment in FIG. 3 uses spatial filtering in conjunction with the relay imaging optics 32, 38, 46 disposed between the stages of a multi-stage power amplifier beamline 31, 36, 42 and between the power amplifier beamline 30 and the PCM 50 to improve conjugation fidelity with a very small loss in output power or overall laser system efficiency.

In the system 10 of FIG. 3, a master oscillator 12 delivers a near diffraction-limited reference beam 14 to the output end of a 3-stage power amplifier beamline through a straightforward wedge beamsplitter (outcoupler) 26. This beam 14 is then amplified in two passes through the beamline 30, extracting over 50% of the stored power. Phase distortions caused by thermal lensing and depolarization caused by thermal birefringence within the amplifiers 31, 36 and 42 are phase reversed (conjugated) by the loop PCM 50. The original diffraction-limited phase front is restored as it passes back through the amplifier beamline 30 and the output beam emerges at ~30 kW power, with near diffraction limited beam quality.

One method for improving the effective conjugation fidelity of the PCM 50 (including a loop PCM) is to add a unique type of external spatial filter that blocks only the non-conjugated portion of the return beam.

Figure 4:
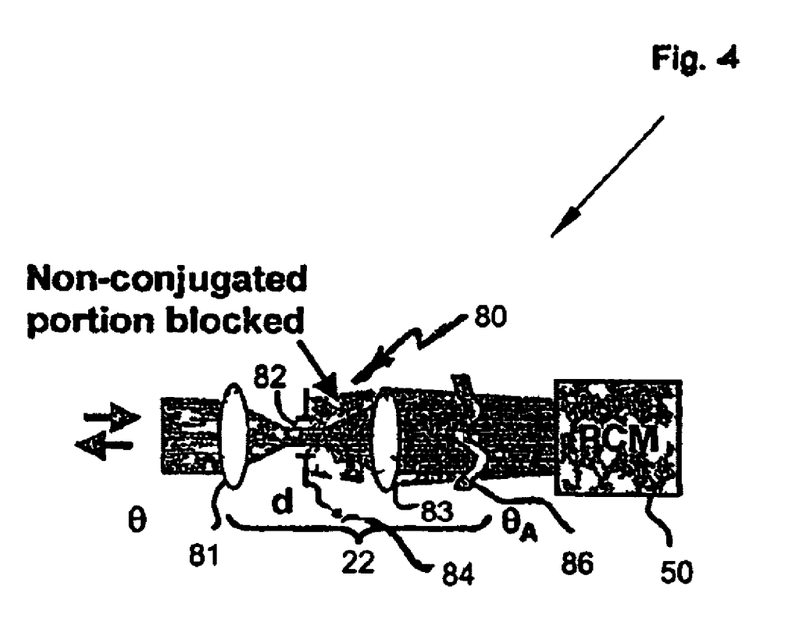
FIG. 4 shows an illustrative embodiment of a spatial filter designed to improve the fidelity of a conjugator in accordance with the teachings of the present invention.

FIG. 4 shows an illustrative embodiment of a spatial filter designed to improve the fidelity of a conjugator in accordance with the teachings of the present invention. The filter 22 is implemented using an imaging telescope 80, with a pinhole aperture 82 at its focus, and an aberrator 86. The aperture 82 is provided in a plate or ring 84. The plate 84 is sandwiched between lenses 81 and 83 of conventional design and construction. In accordance with the present teachings, the aberrator (a.k.a. 'angular multiplier' or 'homogenizer') 86, is disposed between the telescope 80 and the PCM 50. The telescope 80 may be a plate made of metal, glass or other suitably opaque material. In the best mode, the pinhole aperture size (d) is chosen such that the incidence beam with angular divergence 'θ' goes therethrough without any significant losses (i.e. d>f·θ, in the best mode d≈(2 to 3)·f·θ, where 'f' is the focal length of the lens). The aberrator 86 may also be of conventional design and construction. That is, the aberrator is typically chosen with a particular angular spread for a given beam size. Those skilled in the art will appreciate that the parameters of the system should be chosen such that the divergence or angular spread of the aberrated beam is within the acceptance angle of the conjugator and that the beam is not clipped at any point within the conjugator. Equivalently, the parameters of the system should be chosen such that the product of the beam divergence and beam size at the entrance to the conjugator still lies within the acceptable étendue (i.e., the 'd·θ') of the conjugator.

The aberrator 86 ensures that the input beam is further distorted, increasing its étendue, before entering the PCM 50. As is known in the art, 'étendue' is a product of beam size and beam divergence. As such, étendue is a measure of beam quality. High étendue translates to poor beam quality. High étendue means the beam divergence is high for a given beam size. In the best mode, the aberrator 86 is chosen to increase the divergence of the incident beam to some value $\theta_A \approx (2 \text{ to } 3) \cdot \theta$, assuming no magnification in telescope 80.

Because the loop PCM fidelity is not perfect, there is a component of the reflected energy that is non-conjugate to the input beam and has an angular spread $\sim \theta_A$. This non-conjugate component will not be corrected during its second pass through the aberrator (it will actually increase its angular divergence after going back through the aberrator) and will be substantially clipped at the pinhole. The energy that passes through the pinhole 82 is that which corresponds to a peak central lobe in the far field or a very low beam divergence. Since the conjugate component compensates the distortions introduced by the aberrator 86, it does not experience extra losses on its return path through the pinhole. The non-conjugate component, i.e., the spread with a divergence angle $\sim \theta_A$ which is larger than θ is substantially blocked by the pinhole (d<f·θ). Only a small portion $\sim [(d/(f \cdot \theta_A))]^2$ will go through. The conjugate component passes through with minimal loss. This results in a return beam that is dominated by the conjugate component. The effective conjugation fidelity of the combined spatial filter and PCM device, therefore, can be substantially higher than the fidelity of the PCM alone.

A phase conjugation fidelity improvement estimate χ can be made using a simplified relation:

$$\chi = \chi_{PCM}/(\chi_{PCM} + T_{NC}(1 - \chi_{PCM})) \quad [6]$$

where: $\chi_{PCM}$ is the phase conjugation fidelity of a PCM; and $T_{NC}$ is the fraction of the power within the non-conjugate component that is transmitted through the pinhole.

Figure 5:
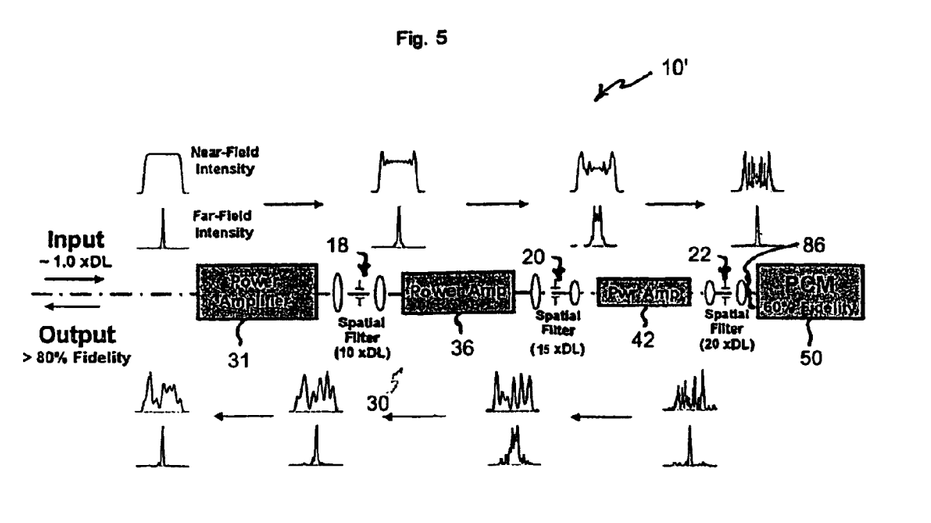
FIG. 5 shows an alternative embodiment of the present teachings where the aberration is supplied by plural amplifiers.

FIG. 5 shows an alternative embodiment of the present teachings where the aberration is supplied by plural amplifiers. FIG. 5 shows the same exemplary amplifier beamline as in FIG. 3 with the inventive spatial filters 18, 20 and 22 added between the amplifiers in the amplifier beamline 31, 36 and 42, and between the amplifier beamline 30 and the PCM 50, to suppress amplified spontaneous emission (ASE) and parasitic lasing and to strip off non-conjugated modes. Note that only one aberrator 86 is required. This is due to the fact that the amplifiers provide the aberration required for the first and second filters 18 and 20 to operate in accordance with the present teachings. A diffraction limited oscillator beam enters the input aperture of the first amplifier 31 of the amplifier beamline 30. The input beam is amplified in a first stage of amplification and focused down with a relay imaging telescope through a pinhole aperture in the first spatial filter 18. In the first filter 18, the pinhole diameter is preferably large relative to the size of the aberrations of the beam. For example, if the input beam is 5 times diffraction limited (×DL) after amplification by the amplifier 31, the spatial filter aperture diameter might be 10 times diffraction limited. This applies to the second and third stages of amplification and filtering as well such that the input beam is amplified and aberrated by the power amplifiers substantially without being affected by the spatial filters, and carries all of the information that it sensed about the aberration induced by the beamline, on the first pass therethrough until it reaches the phase conjugate mirror 50. In the best mode, the spatial filters are 2 to 3 times the étendue of the incoming beam. For example, with an input beam of 1 times DL, after the first stage of amplification, the beam would be 5×DL, hence, the spatial filter would need an aperture size of 10–15×DL. Thus, in FIG. 5, the first spatial filter 18 is shown with an aperture size of 10×DL. In short, the aperture size of each spatial filter should be greater than the beam product or étendue of the incoming beam with adequate margin to minimize power and phase information loss in the first pass beam. The beam enters the PCM and on return therefrom, depending on the fidelity of the PCM, a significant portion of the beam (in this example e.g. 60%) will have the correct wavefront so that it will be corrected on the way out of the PCM and the remaining portion (i.e., 40% of the beam) will not have the correct wavefront. The latter will have a random phase caused by noise in the phase conjugation process. The portion with the correct wavefront will pass through the inventive spatial filters 22, 20 and 18 and will constitute the beam on target. The latter portion will be highly divergent. It will not be simply 20×DL as was the case with the 60% portion with the correct wavefront, it might be 50, 60, 70×DL, for example. Consequently, most of this energy (i.e., the energy outside the 20×DL cone) will be stripped out by the novel filter 22 before entering the amplifier 42. More of this incorrect wavefront energy is stripped by the second and first filters 20 and 22 before amplification preventing this energy from being amplified by the beamline 30. Thus, beam quality is maintained with a lower power loss than that which might be expected in accordance with conventional teachings.

A conventional PCM may be used in the embodiment of FIG. 5. The amplifiers may be of conventional design and construction. As in any well-designed PC MOPA system, the amplifiers should be designed to avoid clipping the beam.

The near-field and far-field beam profiles at the input and output of the laser amplifiers are also shown in FIG. 5. These profiles were derived from a one-dimensional wave optics computer propagation model in MATLAB. For this analysis, the input beam was assumed to be diffraction-limited (near top-hat intensity and flat phase profiles), and the fidelity of the PCM was assumed to be 60%, according to the definition provided earlier. Through the use of the inventive spatial filters, the resultant fidelity of the PC MOPA laser system was increased to over 80%; a substantial improvement over a typically inherent 60% fidelity of the PCM. The modeling also showed that the reduction in the overall efficiency of the laser system was reduced by only 1%, through the addition of the spatial filters.

Those skilled in the art will appreciate that conventionally, a spatial filter is provided only in front of the power amplifier 31. In this case, the amplifiers would aberrate the input beam and the PCM would reflect the beam while correcting for the aberration with the exception of the highly divergent modes. These highly divergent modes are primarily responsible for the loss in fidelity. Typically, the highly divergent modes would also be amplified in two passes through the beamline. The single spatial filter in the output would strip away the amplified highly aberrated portion yielding a specified beam size at the target. Unfortunately, this approach wastes the power in the amplifier by amplifying a portion of the beam which is subsequently discarded.

A limitation on the present teachings is the étendue of the conjugator and the extent to which the beam is aberrated. For example, if the conjugator can only accept aberrations as high as 70 times DL and the incoming beam is 70 DL without spatial filtering, then there may be insufficient headroom in the ability to accept a more highly aberrated beam in the conjugator inasmuch As the present method actually makes the beam worse to make it better from the standpoint of power utilization.

2. Optical Aberration and Spatial Filtering within Loop PCM

A second embodiment of the present invention uses a spatial filtering technique to improve the inherent phase conjugation fidelity of the loop PCM devices. There are many factors that influence phase conjugation fidelity in a thermal nonlinearity loop PCM. These factors include: (1) input beam characteristics (beam power, size, divergence, and polarization); (2) geometry of the nonlinear interaction (beam intersection angle and length of the nonlinear medium); (3) properties of the nonlinear medium (e.g., dn/dT, thermal conductivity); (4) nonlinear cell design (thermal load on a nonlinear medium and optics); (5) noise, instabilities, and parasitic effects in the holographic process; and (6) higher-order mode discrimination in the loop PCM resonator. The advantage of using spatial filtering within the resonator is that non-conjugate modes are not allowed to build and therefore do not deplete the gain of the loop PCM amplifier.

Figure 6:
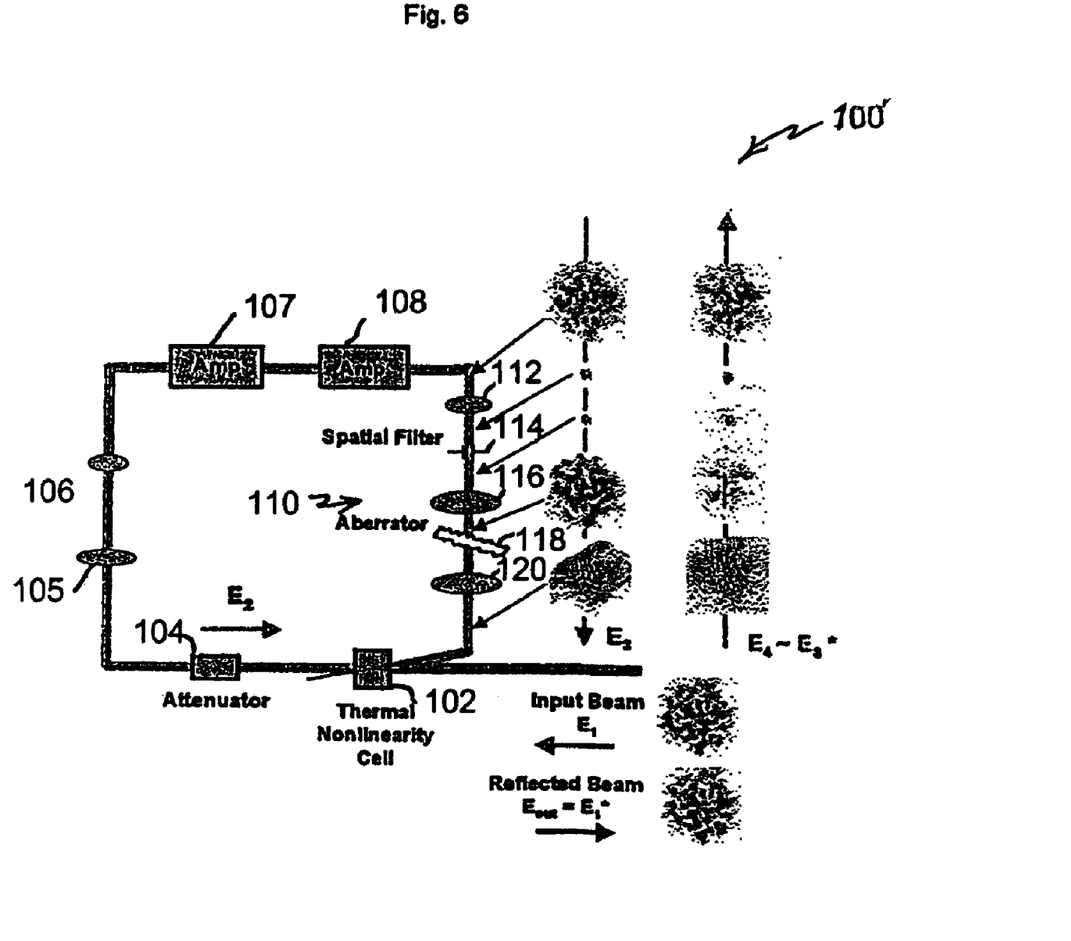
FIG. 6 shows an optical schematic of a loop PCM with an aberrator and spatial filter inserted within the loop resonator in accordance with an alternative embodiment of the teachings of the present invention.

FIG. 6 shows an optical schematic of a loop PCM with an aberrator and spatial filter inserted within the loop resonator in accordance with an alternative embodiment of the teachings of the present invention. This embodiment is similar to the conventional implementation of FIG. 2 with the exception that the laser amplifier of FIG. 2 is shown as two amplifiers in FIG. 6, the nonlinear medium is replaced with a thermal nonlinearity cell, and a spatial filter 110 implemented in accordance with the present teachings is inserted into the resonator. The thermal nonlinearity cell 102 operates on the principle that when a beam with a spatial pattern passes through a liquid with an absorbing medium, the portion of the beam that is more intense will heat the liquid and create an area with a different index of refraction in accordance with the coupling parameter 'dn/dT'. This intensity pattern is created by the interference between two beams in a real-time holography process. The hologram is written into the refractive index of the nonlinear medium, and diffracts light like a mirror surface. With this holographic "mirror," the other mirrors disposed within the loop, and a gain medium; an oscillation condition is set up such that a lasing action can build up from noise in the loop. The holographic mirror is a type that is necessary to generate a phase conjugate return beam. In accordance with the present teachings, the spatial filter 110 is included to suppress the higher order modes by spatial clipping. The spatial filter 110 includes first and second lenses 112 and 116 between which a pinhole aperture 114 is disposed, in optical alignment therewith. A third lens 120 is included to confine the beam within the interaction region of thermal nonlinearity cell 102 and control the stability of the loop PCM resonator; and an aberrator 118 is disposed between the second lens and the third lens.

Beam intensity profiles are also shown at various points within the loop PCM path, which were derived from 2-dimensional wave optics computer modeling in MATLAB. An improvement in the conjugation fidelity of the loop PCM from 61% to 85% is depicted in FIG. 6.

In operation, an input beam $E_1$ enters the loop through thermal nonlinearity cell 102 and travels clockwise around the loop with no substantial clipping as the pinhole aperture 114 within spatial filter 110 should be oversized relative to the clockwise traveling beam. However, the loop resonator, without the inventive aberrator and spatial filter elements inserted, would be capable of supporting many modes that may build up from noise in the opposite counterclockwise direction. These modes, designated $E_4$ in FIG. 6, include the desired phase conjugate mode as well as one or more non-conjugate modes. Aberrator 118 spreads the angle of the non-conjugate modes, increasing the mode size at the focus of the spatial filter and causing these modes to be significantly clipped at pinhole aperture 114. The clipped, non-conjugate modes are therefore lossy and do not build appreciably in the loop resonator. The desired phase conjugate mode, on the other hand, does not experience this clipping loss because the distortions caused by aberrator 118 are compensated by the phase conjugation process. Beam $E_4$ is therefore dominated by the desired phase conjugate mode, such that $E_4$ is conjugate to $E_3$. Beam $E_4$ propagates counterclockwise around the loop to become $E_2$ and is out-coupled from the loop resonator through thermal nonlinearity cell 102 as reflected beam $E_{OUT}$, which is dominated by the mode that is conjugate to $E_1$ ($E_{OUT} \approx E_1^*$).

It should be appreciated that the embodiments of the present invention described herein are exemplary and that different loop PCM resonator configurations, power amplifier configurations (including coherently combined media and fiber media), relay imaging schemes (including reflective and diffractive), spatial filters (pinhole apertures, with lenses or in free space, or highly angle-selective thick Bragg gratings), aperture elements (including both hard and soft aperture means), and optical aberrator elements (including periodic structures and tailored phase sheets with specific Zernike strengths) may be used without departing from the scope and spirit of the present teachings. In addition, other nonlinear optical phase conjugation processes, such as stimulated Brillouin scattering, backward stimulated Raman scattering, photo-refraction, and nonlinear gain may be used without departing from the scope of this invention.

Further, the invention may be implemented with reflective, refractive or diffractive elements. The present teachings are not limited to the optical spectrum. The present teachings may be implemented using energy in other portions of the electro-magnetic spectrum as will be appreciated by those of ordinary skill in the art.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A spatial filter comprising:
   means for providing a nonconjugated beam of electromagnetic energy;
   means for conjugating at least a portion of said beam of electromagnetic energy to provide a conjugated beam;

means for increasing angular spread of said non-conjugated beam and means for suppressing said angular spread non-conjugated beam without suppressing said conjugated beam.

2. The invention of claim 1 wherein said means for increasing angular spread includes an aberrator.

3. The invention of claim 2 wherein the aberrator is an amplifier.

4. The invention of claim 1 wherein said means for suppressing includes an opaque plate with a pinhole aperture therethrough.

5. The invention of claim 1 wherein said means for suppressing includes a highly angle-selective thick Bragg grating.

6. The invention of claim 1 further including first and second lenses disposed on opposite sides of said means for suppressing.

7. A phase conjugate master oscillator/power amplifier laser architecture comprising:

a master oscillator adapted to output a laser beam;

a power amplifier beamline in optical alignment with said beam;

means for creating a beam having phase conjugate energy and non-conjugated energy; and at least one spatial filter in alignment with said amplifier, said filter having means for increasing angular spread of said non-conjugate energy in said beam and means for suppressing said spread non-conjugate energy in said beam without suppressing said conjugated energy in said beam.

8. The invention of claim 7 wherein said beamline includes plural amplifiers.

9. The invention of claim 8 further including a spatial filter between at least two of said amplifiers.

10. A loop phase conjugate resonator comprising:

first means for providing an interference pattern;

second means for providing a nonconiu gated beam of electromagnetic energy;

third means for conjugating said beam of electromagnetic energy;

an amplifier in alignment with said first, second and third means; and a spatial filter in alignment with the amplifier and adapted to increase the angular spread of non-conjugate energy in a beam amplified by said amplifier and suppress said spread non-conjugate energy in said beam without suppressing non-conjugated energy therein.

11. The invention of claim 10 wherein said spatial filter includes an aperture.

12. The invention of claim 10 wherein said spatial filter includes an aberrator.

13. The invention of claim 10 wherein said spatial filter further includes first and second lenses.

14. A method for spatial filtering including the steps of:

providing a conjugated beam and a non-conjugated beam;

increasing angular spread of said non-conjugated beam and suppressing said angular spread non-conjugated beam without suppressing said conjugated beam.

15. A phase conjugating method comprising the steps of:

providing a laser beam;

conjugating at least a portion of said beam;

increasing angular spread of said non-conjugate energy in said beam; and suppressing said spread non-conjugate energy in said beam without suppressing said energy of said conjugated beam.

* * * * *